United States Patent
Zhang et al.

(10) Patent No.: US 10,216,228 B2
(45) Date of Patent: Feb. 26, 2019

(54) MULTIPLE DISPLAY DEVICE HAVING A DISPLAY ON A ROTARY SHAFT

(71) Applicant: Lenovo (Beijing) Co., Ltd., Beijing (CN)

(72) Inventors: Bo Zhang, Beijing (CN); Qihua Xiao, Beijing (CN); Jing Xu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 496 days.

(21) Appl. No.: 14/669,763

(22) Filed: Mar. 26, 2015

(65) Prior Publication Data

US 2016/0077550 A1    Mar. 17, 2016

(30) Foreign Application Priority Data

Sep. 15, 2014   (CN) .......................... 2014 1 0468313
Oct. 9, 2014    (CN) .......................... 2014 1 0528629

(51) Int. Cl.
*G06F 1/16*    (2006.01)
*G06F 3/0484*  (2013.01)

(52) U.S. Cl.
CPC ............ *G06F 1/1643* (2013.01); *G06F 1/165* (2013.01); *G06F 1/166* (2013.01); *G06F 3/0484* (2013.01)

(58) Field of Classification Search
CPC ...... G06F 1/1626; G06F 1/1647; G06F 1/165; G06F 1/1652
See application file for complete search history.

(56) References Cited

U.S. PATENT DOCUMENTS

| | | | | |
|---|---|---|---|---|
| 6,404,623 B1* | 6/2002 | Koshika | ................ | G06F 1/1616 345/87 |
| 6,744,623 B2* | 6/2004 | Numano | ................ | G06F 1/1632 345/87 |
| 7,035,665 B2* | 4/2006 | Kido | ...................... | G06F 1/1616 379/433.13 |
| 7,278,112 B2* | 10/2007 | Numano | ................ | G06F 1/1616 715/778 |
| 7,499,074 B2* | 3/2009 | Kim | ...................... | G06F 1/1605 348/14.01 |
| 7,612,766 B2* | 11/2009 | Shintome | .............. | G06F 1/1616 345/173 |

(Continued)

FOREIGN PATENT DOCUMENTS

| | | | |
|---|---|---|---|
| CN | 101444074 A | 5/2009 | |
| CN | 103069476 A | 4/2013 | |

(Continued)

OTHER PUBLICATIONS

First Chinese Office Action regarding Application No. 201410468313.X dated Oct. 8, 2016. English translation provided by Unitalen Attorneys at Law.

*Primary Examiner* — Alvin H Tan
(74) *Attorney, Agent, or Firm* — Harness, Dickey & Pierce, P.L.C.

(57) ABSTRACT

An electronic device and a display method are provided. The electronic device includes a housing; a first body including a first display unit which is arranged on a first surface of the first body; and a second body located in an end of the housing, where the second body includes a rotary shaft and a second display unit, the second display unit is configured to cover on the rotary shaft and operable to rotate along with the rotation of the rotary shaft.

16 Claims, 9 Drawing Sheets

(56) References Cited

U.S. PATENT DOCUMENTS

| | | | | |
|---|---|---|---|---|
| 8,605,006 B2* | 12/2013 | Nurmi | ................... | G06F 1/1649 |
| | | | | 345/1.1 |
| 8,724,300 B2* | 5/2014 | Smith | ................... | G06F 1/1628 |
| | | | | 206/320 |
| 8,890,802 B2* | 11/2014 | Case, Jr. | ............... | G06F 1/1616 |
| | | | | 345/156 |
| 9,417,784 B2* | 8/2016 | Kwak | ................... | G06F 1/1618 |
| 9,438,713 B2* | 9/2016 | Lee | .................... | H04M 1/0266 |
| 2005/0140574 A1* | 6/2005 | Tamura | ................ | G06F 1/1616 |
| | | | | 345/9 |
| 2007/0300140 A1 | 12/2007 | Makela et al. | | |
| 2012/0005602 A1* | 1/2012 | Anttila | ................. | G06F 3/1431 |
| | | | | 715/761 |
| 2012/0229399 A1* | 9/2012 | Kobayashi | ........... | G06F 3/0486 |
| | | | | 345/173 |
| 2013/0111579 A1 | 5/2013 | Newman et al. | | |
| 2013/0154990 A1 | 6/2013 | Hamada | | |
| 2016/0055827 A1 | 2/2016 | Hamada | | |

FOREIGN PATENT DOCUMENTS

| | | | |
|---|---|---|---|
| CN | 103092325 A | 5/2013 | |
| CN | 103455128 A | 12/2013 | |
| CN | 104011622 A | 8/2014 | |

* cited by examiner

MULTIPLE DISPLAY DEVICE HAVING A DISPLAY ON A ROTARY SHAFT

CROSS-REFERENCES TO RELATED APPLICATIONS

The present application claims the priority to Chinese Patent Application No. 201410468313.X, entitled "ELECTRONIC DEVICE AND METHOD FOR PROCESSING INFORMATION", filed with the Chinese State Intellectual Property Office on Sep. 15, 2014, and the priority to Chinese Patent Application No. 201410528629.3, entitled "ELECTRONIC DEVICE AND DISPLAY METHOD", field with the Chinese State Intellectual Property Office on Oct. 9, 2014, which are incorporated herein by reference in their entireties.

FIELD

This application relates to the field of electronic technology and particularly to an electronic device and a display method.

BACKGROUND

With the rapid development of science and technology and the increasingly fierce market competition, performances and appearances of electronic devices have been vigorously promoted, among which laptops have been more and more popular for their advantages such as cute, easy to carry, strong entertaining or the like, and have become an indispensable part of learning and life. Users can do more and more by using the electronic devices, for example: users can communicate, watch videos, watch movies, play games or the like through a tablet computer with a communication function.

At present, during use of an electronic device by a user, generally, a display screen of the electronic device only displays an application picture in correspondence with the application used currently, and in the case that the application picture in correspondence with the application has more scenes or additional options, the additional options in correspondence with this application cannot be better presented within the limited screen display area, and also the integrity of the picture displayed is impacted. For example, in the process of watching a video, if the user intends to fast-forward, a respective progress bar is required to be rolled out in the display screen, and the progress bar displayed will usually cover the caption in the video picture or partial picture. Furthermore, generally, there will be one or more applications which are running in the background in the electronic device, and in a state of full-screen application, if the user intends to know the variations corresponding to a background running program, generally, only the user exits the picture currently displayed first, can the corresponding information be viewed, thus more operations are required, and the electronic device shares a big burden.

SUMMARY

An electronic device and a display method are provided according to the embodiments of the present disclosure, which addresses the technical issue of inferior effect of display of electronic devices.

An electronic device is provided, which includes:
a housing;
a first body including a first display unit which is arranged on a first surface of the first body; and a second body located in an end of the housing, where the second body includes a rotary shaft and a second display unit, the second display unit is configured to cover on the rotary shaft and operable to rotate along with the rotation of the rotary shaft.

Optionally, the first display unit has a display state and a non-display state;
the second display unit is configured to display first information generated by a first type of trigger event in the case that the first display unit is in the non-display state; and
a display area of the second display unit is smaller than a display area of the first display unit.

Optionally, a region corresponding to the second display unit includes a first preset region and a second preset region;
a first display module is provided within the first preset region, and a second display module is provided within the second preset region;
the second display module is configured to display second information associated with the first information in the case that the first display module displays the first information.

Optionally, the electronic device further includes:
a control module, configured to control the electronic device to execute a first operation associated with the first information in response to a user input.

Optionally, the electronic device further includes:
an authentication module, configured to extract a first characteristic of a user to obtain third information for authentication.

Optionally, the second body includes a detecting unit configured to detect a portion in the second display unit which is not covered by the housing; the portion is operable to display a notifying message corresponding to at least one application of the electronic device.

Optionally, the second display unit covers on a surface of a first portion of the rotary shaft, and the surface of the first portion is exposed from the housing during rotation of the rotary shaft.

Optionally, the second body further includes a supporting portion which is operable to rotate within a present rang along with the rotation of the rotary shaft; and the supporting portion is configured to support the electronic device if the supporting portion rotates to a preset position.

Optionally, the supporting portion includes a first end connected with the rotary shaft and a second end provided with a through hole, the through hole is operable to snap a clip arranged on the housing, to fix the supporting portion to the housing.

A display method of an electronic device is provided, the electronic device includes a first body, a second body and a housing, a first display unit is arranged on the first body and a second display unit is arranged on the second body, where the display method includes:
detecting a working mode of the electronic device;
displaying a first display content on the first display unit of the first body and displaying a second display content on the second display unit of the second body, if the electronic device is in a first working mode; where the first display content corresponding to an application which running on the electronic device, the second display content includes message corresponding to at least one application of the electronic device; and
controlling the second display unit to display a third display content if the working mode of the electronic device is switched from the first working mode to a second working mode; where the third display content is corresponding to the first display content and different from the first display content.

Optionally, the electronic device is in the first working mode if an angel between the electronic device and an horizontal plate is not greater than a first preset range, and in the second working mode if an angle between the electronic device and the horizontal plate is not greater than a second preset range, a minimum value of the second preset range is not less than a maximum value of the first preset range.

Optionally, the first display unit has a display state and a non-display state, the display method includes:

detecting a first type of trigger event in the case that the first display unit is in the non-display state;

generating first information associated with the first type of trigger event in the case that the first type of trigger event is detected; and controlling the second display unit to display the first information.

Optionally, the second display unit includes a first region and a second region; a first display module is provided within the first region, and a second display module is provided within the second region;

The display method includes:

generating second information associated with the first information; and controlling the second display module to display the second information.

Optionally, the display method further includes:

receiving a user input; and executing a first operation associated with the first information in response to the user input.

Optionally, the display method further includes:

extracting a first characteristic of a user to obtain third information for authentication.

Optionally, in the case that the electronic device is in the first working mode, the method further includes:

detecting a first operation in relation to the second display content on the second display unit; and controlling, in response to the first operation, the first display unit to replace the first display content by a content corresponding to the second display content.

Optionally, after controlling the second display unit to display the third display content in the case that the working mode of the electronic device is switched from the first working mode to the second working mode, the method further includes:

detecting a second operation in relation to the third display content; and controlling, according to the second operation, the second display unit to switch display contents from the third display content to a display content corresponding to the second operation.

DETAILED DESCRIPTION

Figure 1:
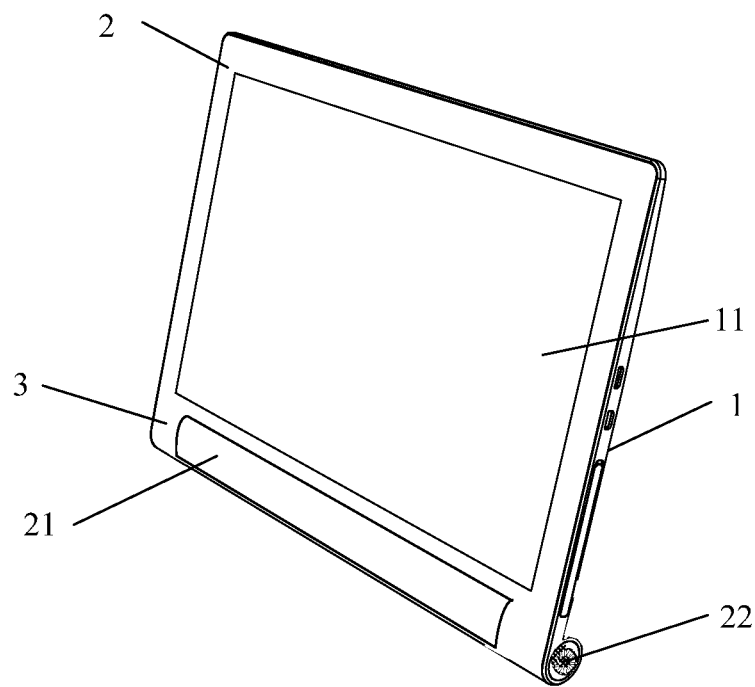
FIG. 1 is a structural view of an electronic device according to an embodiment of the present disclosure.

An electronic device is provided in an embodiment of the present disclosure, which includes a housing, a first body including a first display unit which is arranged on a first surface of the first body, and a second body located in an end of the housing, where the second body includes a rotary shaft and a second display unit, the second display unit is configured to cover on the rotary shaft and operable to rotate along with the rotation of the rotary shaft.

In the embodiment of the present disclosure, the electronic device includes the first body and the second body, and the first body is provided with the first display unit, and the second body is provided with the second display unit and the rotary shaft. That is, the electronic device has two pieces of display screen. Therefore, when a user using the electronic device, the display effect of the electronic device may be improved by mutually cooperation of the first display unit and the second display unit. For example, when a video is displayed via the first display unit, a video progress bar corresponding to the video may be displayed by the second display unit, thereby avoiding a poor display effect resulted from the progress bar covering the caption and picture of the video. Also, the user may know or adjust the current progress at any time via the second display unit, and improve the operation efficiency and reduce the burden of the electronic device.

In addition, the second display unit covers on the rotary shaft, thus no more carriers are required, and the structure of the electronic device is simplified. Furthermore, when the second display unit rotates along with the rotation of the rotary shaft, various displaying portion of the second display unit may be exposed, thus even in the process of adjusting the rotary shaft, the second display unit may still serve to display, thereby improving the display effect of the electronic device.

For making the objects, technical solutions and advantages of the embodiments of the present disclosure more clear, the technical solutions in the embodiments of the present disclosure will be described clearly and completely hereinafter in conjunction with the drawings in the embodiments of the present disclosure. Apparently, the described embodiments are only a part of the embodiments of the present disclosure, rather than all embodiments. Based on the embodiments in the present disclosure, all of other embodiments, made by the person skilled in the art without any creative efforts, fall into the scope of the present disclosure.

In the embodiments of the present disclosure, the electronic device may be various electronic devices such as a PC (personal computer), a laptop, a PAD (tablet computer), a cell phone, etc., which is not limited in the present disclosure.

Furthermore, the terminology "and/or" is simply to describe an associative relationship between associated objects, and it denotes that there will be three kinds of relationship, for example, A and/or B may represent the following three situations such as: A exists alone, A and B coexist, and B exists alone. Furthermore, the Chinese character "/" generally represents that the previous and subsequent associated objects have a relationship of "or".

The optional embodiments of the present disclosure are described in detail hereinafter in conjunction with the accompanying drawings.

According to an embodiment of the present disclosure, it is provided an electronic device, which includes a main body and a housing 1 for protecting the main body. The main body may include a first body 2 and a second body 3. The first body may include a first display unit 11, and the second body may include a second display unit 21 and a rotary shaft 22. The second display unit 21 covers on the rotary shaft 22, and is rotatable along with the rotation of the rotary shaft 22. Reference may be made to FIG. 1 for the detail.

In an embodiment of the present disclosure, the main body may be a body portion in the electronic device other than the housing, and the main body is a main portion for the electronic device to realize various functions. The main body may include components such as a main board, a CPU, a hard disc, a memory, an optical drive, which are in the electronic device.

Optionally, in an embodiment of the present disclosure, the housing may be a case of the electronic device, i.e., a protective housing which can protect the various internal components of the electronic device. Generally, the housing is made of a material having properties of hardness, wear resistant, stain resistant or the like, and an appropriate and delicate housing may contribute to a better aesthetic appearance of the electronic device.

Currently, in the most majority electronic products available in the market, engineering plastic is taken as a main material for the case. The materials for the case of the conventional electronic devices mainly include alloy and plastic.

Alloy cases are mainly made of aluminum-magnesium alloy and titanium alloy. Generally, the aluminum-magnesium alloy has aluminum as a main element, and further has a small quantity of magnesium or other metal materials mixed in for increasing its hardness. The aluminum-magnesium alloy is a metal, and thus having a remarkable thermal conductivity and strength. The aluminum-magnesium alloy has a hard nature, a small weight, a low density, a good heat dissipation performance, a substantial pressure resistance, and may fully satisfy requirements of the high integration, light and thin, miniaturization, crash resistance, electromagnetic shielding and heat dissipation from the 3C products. The hardness of the aluminum-magnesium alloy is multiple times of that of a conventional plastic, and the weight of which is only one third of the latter one. Generally, the aluminum-magnesium alloy is used in a case of a medium or high grade ultra thin laptop or a laptop having a small dimension. Furthermore, a silver white aluminum-magnesium alloy case may enable the product to be more luxury, elegant and ease to be colored, and may be turned into a characterized powder-blue and pink by a surface treatment process, which adds a lot of attractiveness to the laptop, and is an overwhelming advantage compared with the engineering plastic and the carbon fiber. Therefore, the aluminum-magnesium alloy become a first choice material for making a case of a portable laptop, currently, laptops of most manufactures adopt the aluminum-magnesium alloy technology for the case.

Titanium alloy may be referred to as a reinforced version of an aluminum-magnesium alloy, and the titanium alloy is different from the magnesium alloy, in addition to the metal mixed, mainly in that a carbon fiber material is further mixed, thus not only heat dissipation, strength, and surface texture are all excellent than those of the aluminum-magnesium alloy, but also the manufacturability is better, and the appearance is more complex and variable than the aluminum-magnesium alloy. The key breakthrough thereof is higher obdurability, and smaller thickness. With respect to the obdurability, the titanium alloy is three to four times of that of magnesium alloy. The higher the obdurability is, the larger the pressure can be subjected, and the screen with bigger dimension can be supported. Therefore, for a device made of titanium alloy, even equipping with a displayer having a dimension of 15 inch, it is not required to preserve a too wide frame around the panel. As for thickness, the thickness of titanium alloy is only 0.5 mm, which is half of the thickness of the magnesium alloy, and the thickness reduced by half may have the volume of the laptop become smaller. The only disadvantage of the titanium alloy is that, the laptop case with a complicated structure has to be developed by complicated process procedures such as welding, etc. and these production processes cause high costs, and hence the laptop case is very expensive.

Materials for making plastic cases include carbon fiber, PC-GF (Polycarbonate PC) and ABS engineering plastic, among which, PC-GF is also one of the materials adopted for developing a case of a laptop, with petroleum as its raw material, which becomes a polyester chip particles after being processed in a polyester chip factory, and then becomes finish products after being processed in a plastic factory. In view of practical, its heat dissipation performance is also better than that of ABS plastic, and heat may be uniformly dissipated, however the primary disadvantage thereof is its fragile nature, and once falling off, it may be broken. The conventional optical disks are just made of this kind of material. Whether from appearance or from the feeling in touch, the PC-GF material feels like metal. And if there's no mark in the laptop, simply seen from the appearance without observing in detail, one may regard it as an alloy material.

ABS engineering plastic: ABS engineering plastic, i.e., PC+ABS (engineering plastic alloy), and in the chemistry industry, the Chinese name is plastic alloy. Being named as PC+ABS is because this kind of material not only has excellent thermal and weathering resistance, dimensional stability, as well as impacting resistance as of PC resin, but also has excellent fluidity in machining as of ABS resin. Therefore, when the ABS engineering plastic is used in products having a thin wall and a complex shape, the excellent performances thereof may be preserved and the formability of a material made of a plastic and one resin may be preserved. The primary disadvantage of the ABS engineering plastic is its large weight, and inferior thermal conductivity. Generally speaking, ABS engineering plastic has been adopted by most laptop manufacturers due to its low cost, and currently, most laptops having plastic cases take ABS engineering plastic as raw materials.

In an embodiment of the present disclosure, the first display unit may be a display screen arranged in the electronic device, and the first display unit may be a touch display unit or a non-touch display unit. For example, if the electronic device is a tablet computer, then the first display unit may be a touch sensitive display screen of the tablet computer, and via the touching operation performed by the user to the first display unit, for example, via the touching operation performed by the hand of the user or a stylus, the electronic device is enabled to response correspondingly, thus realizing corresponding functions.

Generally, the first display unit may be configured to display scenes in correspondence with various applications in the electronic device, for example, game interface, video interface, or webpage interface etc.; or the first display unit may also be configured to display information stored in the electronic device, or display information acquired from other electronic devices.

In an embodiment of the present disclosure, the second display unit covers on the rotary shaft, thus the second display unit may be a flexible touch sensitive screen. At present, the flexible screen may be made by mounting the Organic Light-Emitting Diode (abbreviated as OLED) on flexible materials such as plastic or metal foil, the flexible OLED panel may be in a concave shape from top to bottom, and the curve radius may be up to 700 micrometer. A plastic substrate is adopted and a protective film is adhered on the back side of the panel by means of thin film enclosure technique, therefore, the panel becomes bendable and has good flexibility, and its durability degree is remarkably higher than other screen, and thus the probability for unexpected damage of the electronic device is reduced.

Optionally, in the embodiment of the present disclosure, the second display unit and the first display unit may be interconnected, thus when the electronic unit performing display, the first display unit and the second display unit may serve to display simultaneously. For example, the associated display contents may be displayed, for example, the first display unit displays the video for watching, and the second display unit displays the progress control bar associated with the video; or, the two display units may display non associated display contents, for example, the first display unit may display a webpage, and the second display unit may display the message in correspondence with the application running in the background.

Optionally, in an embodiment of the present disclosure, the second display unit covers on the rotary shaft, and the rotary shaft is generally in a column shape, hence the second display unit may be a flexible screen covering on the surface of the rotary shaft.

Figure 2:
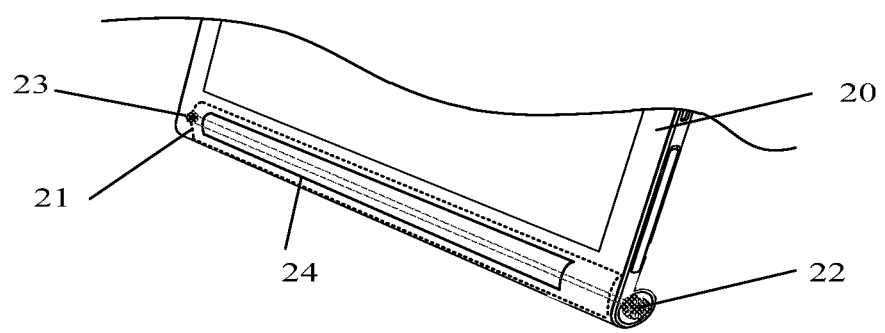
FIG. 2 is a schematic view showing the structure of a rotary shaft according to an embodiment of the present disclosure.

In the specific implementation process, the second body and the first body may be connected by the rotary shaft, and form the main body in the housing. The rotary shaft may be a scroll structure. For example, the rotary shaft may be a fixed structure fixed inside the housing by a fixing shaft, and the fixing shaft may form a damping structure together with the rotary shaft, thereby enabling the rotary shaft to rotate in the housing. Reference is made to FIG. 2, which is a side view of the electronic device, the numeral 20 indicates the electronic device and the numeral 21 indicates the second display unit covering on the rotary shaft, the numeral 22 indicates the rotary shaft, and the numeral 23 indicates the fixing shaft forming the damping structure together with the rotary shaft, and the numeral 24 indicates a portion in the housing which does not cover the second display unit.

In an embodiment of the present disclosure, the second body may further be provided with a detecting unit, and the detecting unit may be configured to detect the portion, not covered by the hosing, in the second display unit. The portion, not covered by the housing, in the second display unit can display a notifying message corresponding to at least one application of the electronic device.

The detecting unit may be a sensor, e.g. a light sensor etc., thus during rotation of the rotary shaft, the portion in the second display unit which is not covered by the housing may be detected by the detecting unit, thus through a controller or the like in the electronic device, the portion which is not covered may be taken as a display area, and the notifying message corresponding to the application may be displayed on the portion.

Optionally, in an embodiment of the present disclosure, the second display unit may cover on a surface of a first portion of the rotary shaft, and the surface of the first portion may be exposed from the housing during rotation of the rotary shaft. i.e., the position fitted against by the second display unit may be the rotary shaft surface which can be observed through an openness on the housing during rotation of the rotary shaft. Reference is still made to the display cutout corresponding to the second display unit in FIG. 2.

In the embodiment of the present disclosure, the second body may further include a supporting portion which is rotatable in a preset angle range along with the rotation of the rotary shaft. In addition, when the supporting portion rotates to a position that the relative position between the supporting portion and the body is a preset relative position, the supporting portion may serve to support the electronic device.

Figure 3A:
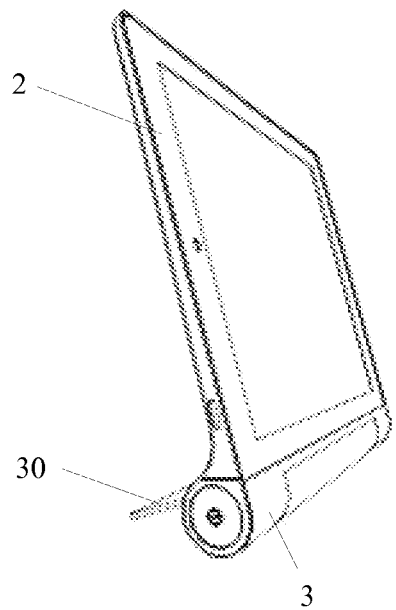
FIGS. 3A to 3C are schematic views showing working modes of the electronic device.

The preset angle range may be determined according to a working mode of electronic device. For example, if the electronic device is in a standing mode, the preset angle may be an angle in a range of 60 degrees to 90 degrees, e.g. 80 degrees, and thus may have support function to the electronic device. Reference is made to FIG. 3A, which shows the electronic device in the standing mode, the numeral 30 indicates the supporting portion, and here, the supporting portion and the second body support the electronic device.

Figure 3B:
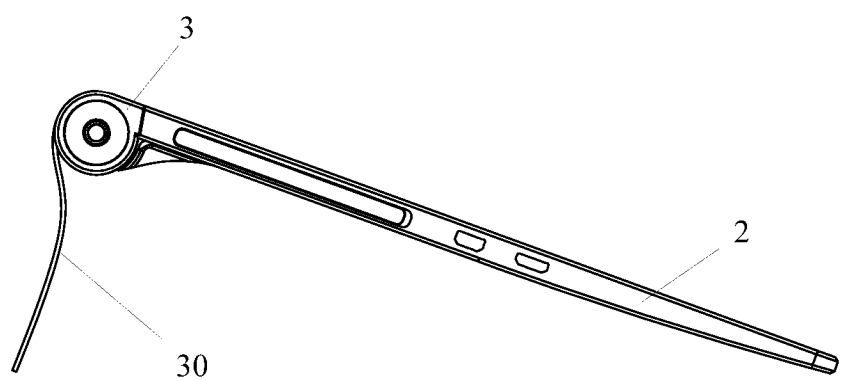
Figure 3C:
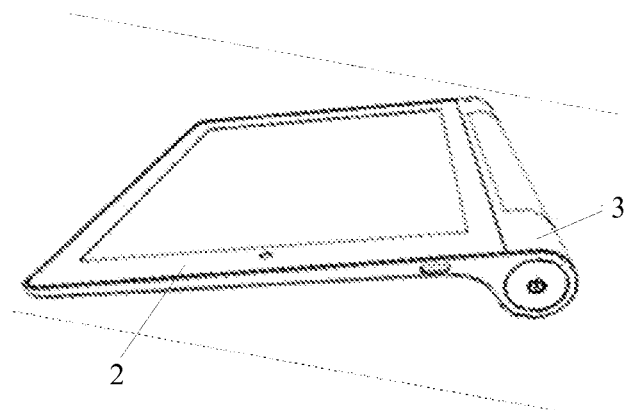

Alternatively, in the case that the supporting portion moves to a second surface which is opposite to the first surface occupied by the first display unit in the first body, for example, in the case that the angle between the supporting portion and the housing is relatively small, e.g., less than 45 degrees, then the electronic device may be supported by the supporting portion and a top end of the first body, reference is made to FIG. 3B. In the case that the angle between second surface and the housing is 0 degree, the electronic device may be in a browsing mode, in such a case, the top ends of the second body and the first body may be regarded as supporting points for supporting the electronic device, reference is made to FIG. 3C.

Optionally, in an embodiment of the present disclosure, the supporting portion may further include a first end connected with the rotary shaft and a second end in which a through hole is provided, and the through hole may be configured to snap a clip provided on the housing when the supporting portion is in the preset relative position, to fix the supporting portion onto the housing.

Figure 4A:
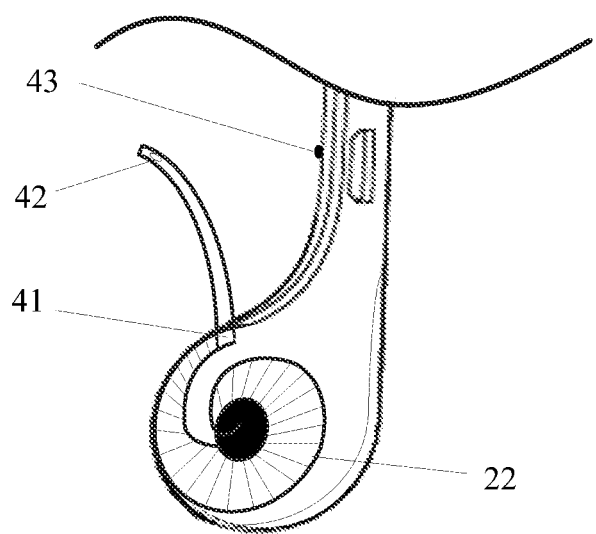
FIGS. 4A to 4B are schematic views showing the structure of a support according to an embodiment of the present disclosure.
Figure 4B:
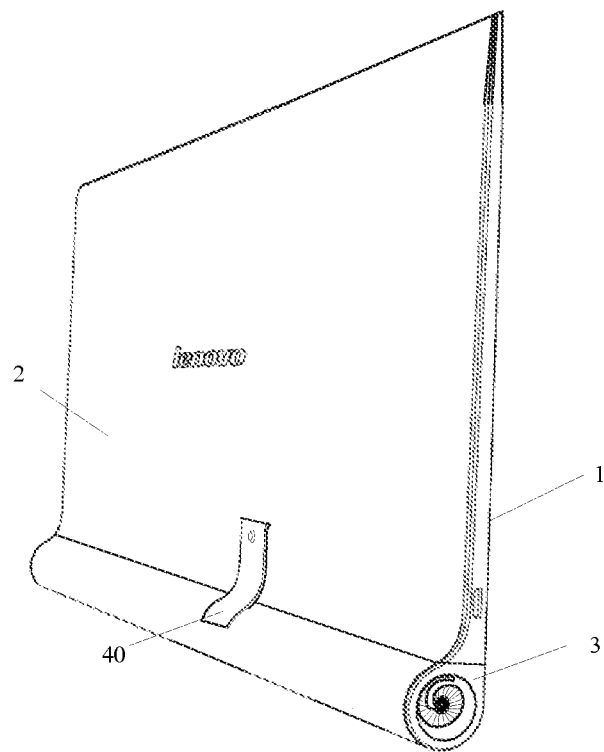

The clip may be arranged on the second surface of the first body, and when rotating the supporting portion by the rotary shaft to a position to abut against the second surface, the supporting body is fixed through the snap between the hole and the clip. Reference is made to FIG. 4A, in which numeral 41 indicates the first end of the supporting portion, and the first end is connected with the rotary shaft, and numeral 42 indicates the through hole provided in the second end, and the numeral 43 indicates the clip provided on the second surface. In the case that the through hole and the clip are snapped, the supporting portion 40 is fixed on the housing, reference is made to FIG. 4B.

In an embodiment of the present disclosure, the electronic device has the first display unit and the second display unit, hence, when using the electronic device, different display units may serve to display different applications, thus improving the display effect of the electronic device, and enhancing the user's experience.

Figure 5:
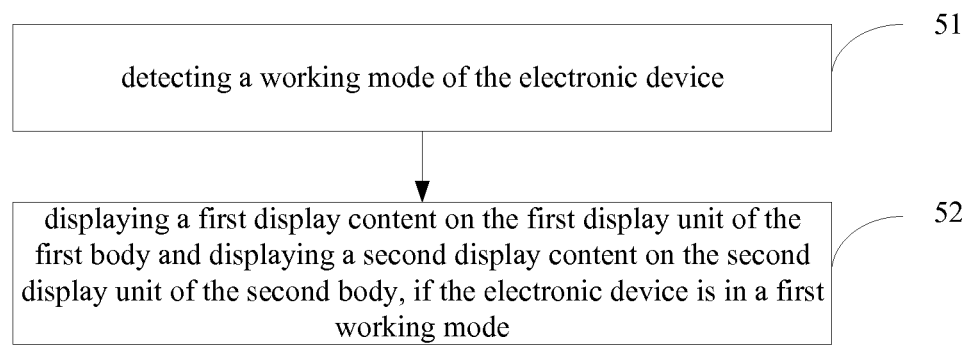
FIG. 5 is a flow chart of a display method according to an embodiment of the present disclosure.

Reference is made to FIG. 5, a display method of an electronic device is provided in an embodiment of the present disclosure, the electronic device includes a first body, a second body and a housing; a first display unit is arranged on the first body and a second display unit is arranged on the second body, the display method includes steps 51 to 52.

Step 51 includes detecting a working mode of the electronic device.

Step 52 includes displaying a first display content on the first display unit of the first body and displaying a second display content on the second display unit of the second body, if the electronic device is in a first working mode; where the first display content corresponding to an application which is running on the electronic device, the second display content includes a message corresponding to at least one application of the electronic device.

Figure 6:
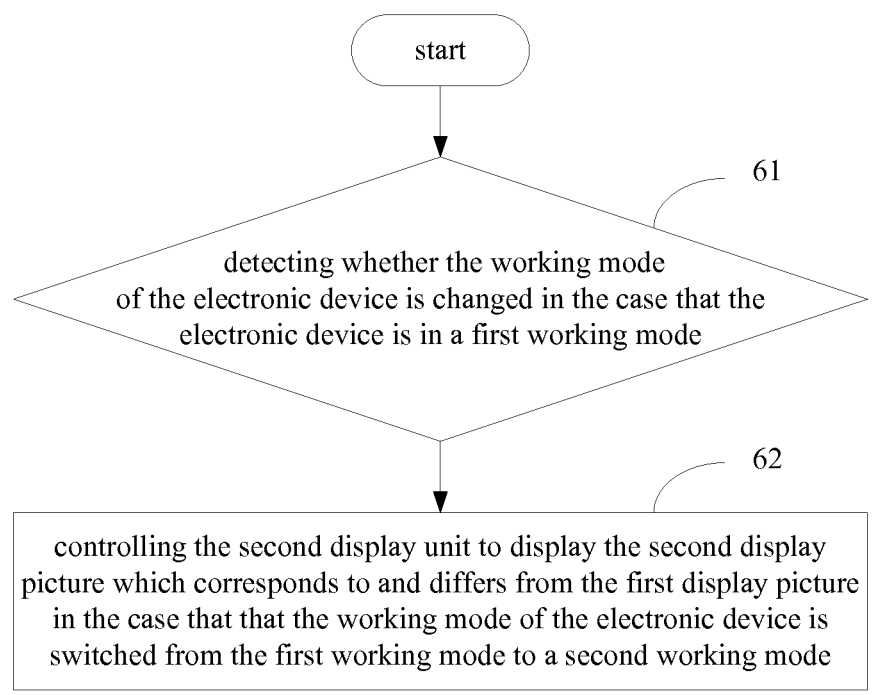
FIG. 6 is a flow chart of a display method according to an embodiment of the present disclosure.

Reference is made to FIG. 6, based on the same concept, according to an embodiment of the present disclosure, it is further provided a display method, which is applicable to an electronic device. The electronic device includes a main body and a housing for protecting the main body, the main body includes a first body provided with a first display unit and a second body provided with a second display unit. The method may include steps 61 to 62.

Step 61 may include: detecting whether the working mode of the electronic device is changed in the case that the electronic device is in a first working mode; where in the first working mode, the first display unit is configured to display a first display picture corresponding to an application currently running, and the second display unit is configured to display contents including a message corresponding to at least one application installed in the electronic device; the electronic device is in the first working mode in the case that an angle between the electronic device and a horizontal plane is not larger than a first preset angle range.

In an embodiment of the present disclosure, the first working mode may be a reading mode in which the electronic device is in, i.e., the angle between the electronic device and the horizontal plane may be in a range less than 45 degrees, for example, the first preset angle range may be from 0 degree to 45 degrees, reference may be made to FIG. 3B for the attitude of the electronic device in such a case.

The first display unit may be a display screen having a large dimension which is provided on the first body, the application picture corresponding to the current application may be displayed via the first display unit. For example, the first display unit may be used to display movie or music videos, thus providing a better visual experience for the user.

The second display unit may be a display unit connected with the first display unit. Via the second display unit, the application running in the background in the electronic device may be displayed.

For example, in the case that multiple applications are installed in the electronic device, the application picture corresponding to the first application in the current application may be displayed via the first display unit, the first application may be a video player, and the first application picture is a video picture. In such a case, if there are still other applications running in the electronic device, for example, short message or micro-blog application, then, the message corresponding to the micro-blog application and/or short message application may be displayed via the second display unit, for example, when receiving a new message, the second display unit may prompt the indication showing the new message.

Optionally, in the embodiment of the present disclosure, in the case that the electronic device is in the first working mode, whether the working mode of the electronic device is changed is detected. The method may further include: detecting whether a first operation for the first application reminder message in the second display unit is achieved in the case that the electronic device is in the first working mode; and controlling the first display unit to replace the first display picture to an application picture corresponding to the first application reminder message in response to the first operation.

That is, in the case that the second display unit displays reminder information for at least one application, through the first operation for the reminder information for the first application, the user may have the electronic device control the first display unit in the electronic device to display the application picture corresponding to reminder information for the first application. For example, in the case that the second display unit displays new reminder information for micro-blog, the user may have first display unit display the corresponding micro-blog via clicking the reminder information. Alternatively, in the case that the electronic device is in response to the first operation, the application picture corresponding to the reminder information may be directly displayed on the second display unit. For example, the first application reminder message is a short message reminder, and then after the first operation is performed, the application content corresponding to the first application reminder message may be displayed in the second display unit directly, for example, the complete received message is displayed, or it may display the application picture corresponding to the short message application directly.

In the practical testing, whether the working mode of the electronic device is changed or not may be determined by detecting the angle between the electronic device and the horizontal plane.

Step 52 may include: controlling the second display unit to display the second display picture which corresponds to and differs from the first display picture in the case that that the working mode of the electronic device is switched from the first working mode to a second working mode; where the electronic device is in the second working mode in the case that an angle between the electronic device and a horizontal plane is not less than a second preset angle range, and a minimum value of the second preset angle range is not less than a maximum value of the first preset angle range.

In an embodiment of the present disclosure, the electronic device is in the second working mode may be means that the electronic device is in a standing mode, in such a case, the angle between the electronic device and the horizontal plane may be in the second preset angle range, the angle in which is larger than the angle in the first preset angle range. For example, if the first preset angle range is from 0 to 50 degrees, then the second preset angle range may be from 60 degrees to 90 degrees, and when it is detected that the angle between the electronic device and the horizontal plane is larger than or equal to 60 degrees, it may be determined that the working mode of the electronic device is changed, i.e., changed from the first working mode to the second working mode.

In such a case, the display picture corresponding to the first display unit may be displayed via the second display unit. For example, if in the first working mode, the first display picture in correspondence with the first display unit is a video picture, and the second display unit displays the application reminder message corresponding to the application running in the background of the electronic device, and then when it is determined by detecting that the working mode of the electronic device is switched into the second working mode, it may control the display picture in correspondence with the second display unit to be changed into the application picture corresponding to the first display picture. For example, the caption in the first display picture is displayed via the second display unit, and the second display unit serves as an extended screen corresponding to the first display unit, and it is simply required to display in the first display unit image picture corresponding to the video picture, thus avoiding the covering to the video picture by the caption part, and providing good watching effect for the user.

Optionally, in an embodiment of the present disclosure, after the second display unit is controlled to display the second display picture which corresponds to the first display picture and has different display content from the first display picture when it is determined by detecting that the working mode of the electronic device is switched from the first working mode to the second working mode, the method may further include: detecting whether a second operation for the second display picture is achieved; and controlling, according to an operating posture in correspondence with the second operation, the second display unit to switch from displaying the second display picture to displaying an operation picture corresponding to the operating posture.

The second operation may be an operation performed by the user to the second display unit via a finger or a stylus, for example, rolling out the menu column via the second operation, choosing and checking new messages.

In practical operation, in the case that the electronic device provided in an embodiment of the present disclosure performs display by the first display unit and the second display unit, it may have at least the following three application scenes.

First scene: in the case that the first display unit is turned off, there are programs such as Wechat, stock, weather, running in the background in the electronic device, then the messages corresponding to various applications may be scrolling displayed in the second display unit. When the user receives new messages via the electronic device, for example a message from Wechat, or update message regarding stock, the user touches the second display unit, and the corresponding application program is automatically displayed in the main screen, which facilitate reading by the user (a power button is not required to be pushed).

Second scene: the user adds an APP which is required to be reminded for its updating condition from the first display unit to the second display unit via a moving operation of moving down the APP (Application) in the first display unit, for example, clicking an icon in correspondence with a certain application, and then dragging the icon towards the direction of the second display unit; also, the user may cancel the application reminder message corresponding to this APP to be displayed in the second display unit via moving up the APP in the second display unit.

Third scene: in the case that the electronic device is in the first working mode, that is, the electronic device displays video via the first display unit, the second display unit may serve as an extended screen of the first display unit, for example, functions such as sound adjustment and page turning may be performed via the second display unit, which may not affect the first display picture displayed on the first display unit.

According to an embodiment of the present disclosure, it is provided an electronic device, which includes a main body and a housing for protecting the main body. The main body includes: a first body including a first display unit which is provided on a first surface of the first body; and a second component located in an end on a first side of the housing. The second body includes a rotary shaft and a second display unit. The second display unit covers over the rotary shaft, and is rotatable along with the rotation of the rotary shaft.

In the embodiment of the present disclosure, the main body of the electronic device includes the first body and the second body, and the first body is provided with the first display unit, and the second body is provided with the second display unit and the rotary shaft. That is, the electronic device has two pieces of display screen. Therefore, when a user using the electronic device, the display effect of the electronic device may be improved by mutually cooperation of the first display unit and the second display unit. For example, when a video is displayed via the first display unit, a video progress bar corresponding to the video may be displayed by the second display unit, thereby avoiding a poor display effect resulted from the progress bar covering the caption and picture of the video. Also, the user may know or adjust the current progress at any time via the second display unit, and improve the operation efficiency and reduce the burden of the electronic device.

Further, the second display unit covers on the rotary shaft, thus no more carriers are required, and the structure of the electronic device is simplified. Furthermore, when the second display unit rotates along with the rotation of the rotary shaft, various displaying portion of the second display unit may be exposed, thus even in the process of adjusting the rotary shaft, the second display unit may still serve to display, thereby improving the display effect of the electronic device.

Figure 7:
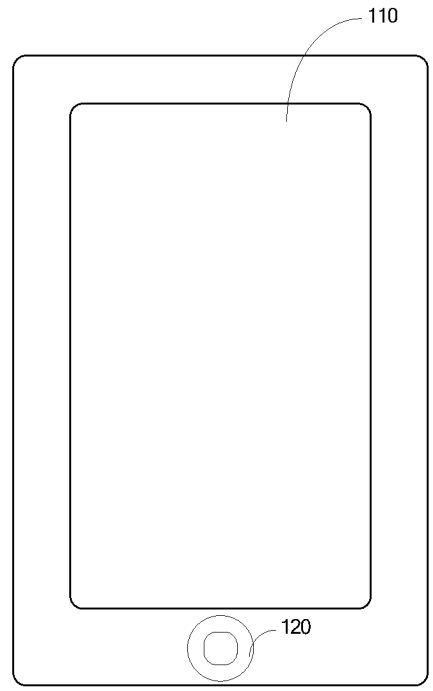
FIG. 7 is a structural view of another electronic device according to an embodiment of the present disclosure.
Figure 8:
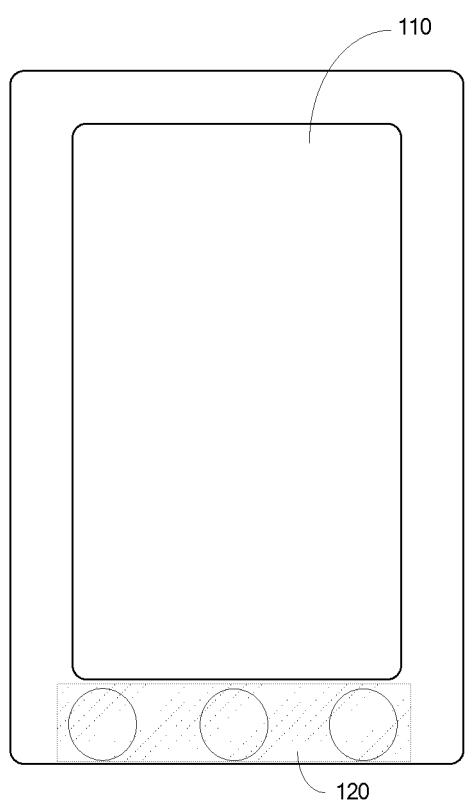
FIG. 8 is a structural view of another electronic device according to an embodiment of the present disclosure.
Figure 9:
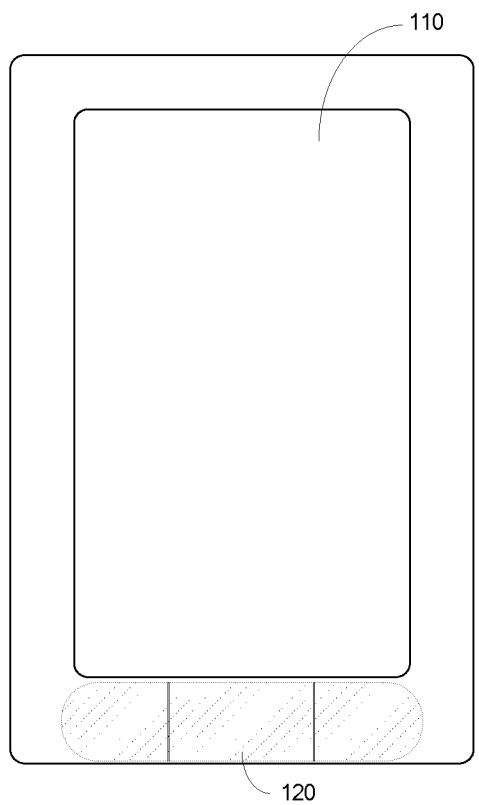
FIG. 9 is a structural view of another electronic device according to an embodiment of the present disclosure.
Figure 10:
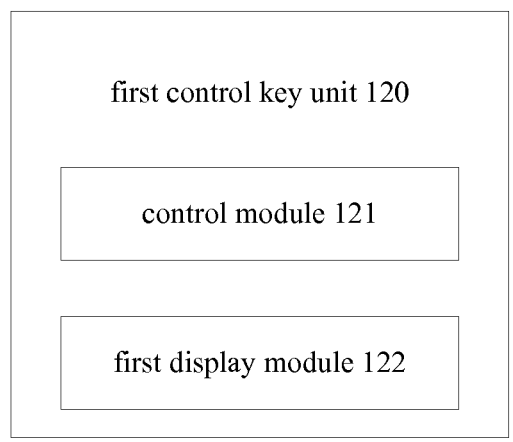
FIG. 10 is a structural view of a control key unit according to an embodiment of the present disclosure.
Figure 11:
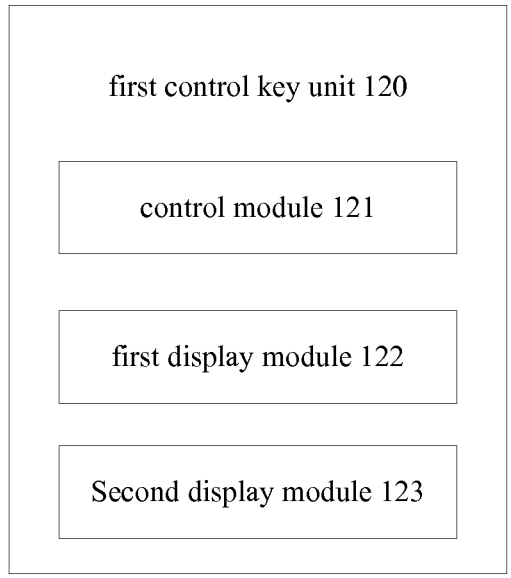
FIG. 11 is a structural view of another control key unit according to an embodiment of the present disclosure.

According to an embodiment, there is provided another electronic device as shown in FIGS. 7 to 9. The electronic device is a first electronic device including a first display unit 110 and a first control key unit 120, where the first display unit 110 has a display state and a non-display state; the first control key unit 120 includes at least one control key module 121 for receiving a user input.

A region corresponding to the control key module 121 of the first control key unit 120 is a first preset region.

The control key unit 120 further includes a first display module 122 provided within the first preset region.

The first display module 122 is configured to display first information generated by a first type of trigger event in the case that the first display unit is in the non-display state.

A display area corresponding to the first display module is smaller than a display area corresponding to the first display unit.

The first electronic device may be any electronic device, such as a mobile phone or a panel computer.

The first display unit 110 may include a display screen and a processor providing image data to be display on the display screen. The processor may be a Central Processing Unit, a Digital Signal Processor, a programmable controller, or the like. The display screen may be a liquid crystal display screen, an organic light emitting diode display screen, or the like.

In FIG. 7, the first control key unit 120 includes only one control key module. Then the display region corresponding to the control key module, i.e., the first preset region, is the whole region where the first control key unit 120 is revealed on the surface of the electronic device. In this case, the first display module is provided within the first preset region and has a display area smaller than or equal to the area of the first preset region.

In FIG. 8, the first control key unit 120, which is illustrated by the shaded area, includes three control key modules that are set separately. Each of the regions on the surface of the first electronic device, which is illustrated by each of three solid circles in FIG. 8, is a region corresponding to each of the control key modules, i.e., the first preset region. The first display module is provided within the first preset region and has a display area smaller than or equal to the first preset region. There may be one or more first display modules. For example, in the case that each of the regions on the surface corresponding to each of the control key modules in FIG. 8 is provided with a first display module, there are three first display modules.

In FIG. 9, the first the first control key unit 120, which is illustrated by the shaded region, includes three control key modules. In this case, the first preset region is the region where the control key modules are revealed on the surface of the electronic device.

The first display unit 110 is configured to display information such as an image or text information in the display state, and not display any information in the non-display state. Assuming that the first display unit 110 has a first power consumption in the display state and a second power consumption in the non-display state, the first power consumption is more than the second power consumption. Specifically, in the case that the first display unit 110 is in the display state, the first display unit 110 is normally in the on-state, which means the image processor is processing image data and the display screen is displaying information; in the case that the first display unit 110 is in the non-display state, the display screen is normally in the off-state, and the image processor may be in an idle state, not performing any image data process. In the case that the display screen is turn off, a light source or a drive of the display screen is in the off state.

The first control key unit includes at least one control key module, each of which may receive a user input to control the first electronic device to perform a certain operation. The control key module may be a HOME key, a RETURN key, a MENU key, or the like, which is provided on the same surface of the electronic device as the first display unit.

The first display module may include a display screen and an image data processor. The display area of the first display module is smaller than that of the first display unit. Correspondingly, the performance of the image data processor of the first display module may be lower than that of the first display unit. For example, the image data processor of the first display unit may be a multi-core processor, and the image data processor of the first display module may be a single core processor. Alternatively, the image data processor of the first display unit may be an M-thread processor, and the image data processor of the first display module may be an N-thread processor where M and N are positive integers and N is smaller than or equal to M. In practice, the image data processors of the first display module and the first display unit may be integrated as one processor.

Optionally, the integrated image data processor does not process image data of the first display unit and image data of the first display module at the same time. The first display module has a display state and a non-display state. The first display module has a third power consumption in the display state, which is much less than the first power consumption.

A control key corresponding to the control key module may be an entity control key, such as a HOME key of a mobile phone with OS system; or a virtual control key, such as a control key of a mobile phone with Android system. In the case of the entity control key, a user input may be determined by detecting a deformation or mechanical displacement of the control key module. In the case of the virtual control key, no such deformation or mechanical displacement occurs when a user input is detected. The control key module may, for example, include an infrared transceiver. If the virtual control key is touched by a user's finger, the received amount of reflected infrared ray is increased, whereby a user input is determined.

In the embodiment, a first display module is provided within at least a part of the first preset region. The first display module, which is a component of the first control key unit, causes the first control key module to be capable of receiving and displaying a user input.

The display area of the first display module is smaller than the display area of the first display unit, so that the power consumption of the first display module in the display state is less than the power consumption of the first display unit in the display state.

Optionally, the display area of the first display module is not larger than the area of the first preset region.

When the electronic device is triggered by a first type of trigger event and the first display unit is in the non-display state, the first display module is switched to the display state to display first information associated with the first type of trigger event.

The first type of trigger event includes at least the following two kinds of event.

The first kind of the event refers to that an instruction sent from a second electronic device is received by the first electronic device. For example, information or a communication request sent from a second electronic device is received by the first electronic device.

In other technology, for example, when a message such as a short message, a Fetion message, or a Wechat message is received from the second electronic device, a user has to cause the first display unit to be in the display state in order to check the sender or the content of the message, which results in a large power consumption in the display state due to a large screen of the electronic device such as a mobile phone or a panel computer. However, in the embodiment, it is possible to display a name, a nickname or a telephone number of the sender of the message by the first display module so that the user may determine whether to view the message, and it is also possible to display the message directly by the first display module if the message is short.

For another example, when a voice communication request sent from the second electronic device is received by the first electronic device, identification information about the caller is displayed by the first display module, so that the user may determine whether to answer the call.

The second kind of the event refers to a trigger event preset in the first electronic device. For example, when a jogging application, which detects a jogging speed and a heart rate, runs on background of the first electronic device and the first display unit is in the non-display state, the jogging speed and the heart rate may be displayed by the first display module to avoid the problem of large power consumption due to the large screen of the first display unit.

In the electronic device according to the embodiment, the first display module is added into an existing control key unit for the purpose of displaying the first information by the first display module having a smaller area and lower power consumption and the first display unit is in the non-display state, leading to not only a convenient user operation but also a lower power consumption of the electronic device.

According to the embodiment, there is provided another electronic device as shown in FIGS. 7 to 9. The electronic device is a first electronic device including a first displaying unit 110 and a first control key unit 120, where the first display unit 110 has a display state and a non-display state; the first control key unit 120 includes at least one control key module 121 for receiving a user input.

A region corresponding to the control key module 121 of the first control key unit 120 is a first preset region.

The control key unit 120 further includes a first display module 122 provided within the first preset region.

The first display module 122 is configured to display first information generated with a trigger of a first type of trigger event in the case that the first display unit is in the non-display state.

A display area corresponding to the first display module 122 is smaller than a display area corresponding to the first display unit.

A region corresponding to the first control key unit 120 includes the first preset region and a second preset region.

The first control key unit further includes a second display module 123 provided within the second preset region.

The second display module 123 is configured to display second information associated with the first information.

The sum of the display area corresponding to the first display module 122 and a display area corresponding to the second display module 123 is smaller than the display area corresponding to the first display unit 110.

The second display module is provided within the second preset region. The second preset region may be a region around the control key module on the surface of the electronic device as show in FIG. 7, or the shaded region except the region in the solid circle as shown in FIG. 8, or a region around the three control key modules as shown in FIG. 9.

The sum of the display area corresponding to the first display module and a display area corresponding to the second display module is smaller than the display area corresponding to the first display unit. Optionally, the display area corresponding to the first display module is smaller than the display area corresponding to the second display module.

Similar to the first display unit and the first display module, the second display module has a display state and a non-display state. The second display module has a fourth power consumption in the display state, and the sum of the fourth power consumption and the third power consumption is smaller than the first power consumption.

In practice, when the first display unit is in the display state, the second display module is in the non-display state to further reduce the power consumption of the electronic device and thus prolong the standby time period thereof. Whether the second display module is in the display state or the non-display state may be specified by a user input or an instruction from the first electronic device.

In the embodiment, the second display module is configured to display at least second information associated with the first information. For example, when a message sent from the second electronic device is received by the first electronic device, the first display module may be configured to display identification information of the sender of the message, such as a name, a nickname or a telephone number of the user of the second electronic device, and the second display module is configured to display the content of the message sent from the second electronic device.

For another example, the first display module displays the first information such as the heat beat of the user when jogging, and the second display module displays the second information such as the map and route for the jogging.

The first information and the second information may be associated with respect to the contents or a trigger relation between them. For example, the second information is generated based on a user input and the first information.

In the second embodiment, the second display module is also added to the first control key unit according to the first embodiment, in order to increase the display area to display the second information associated with the first information while the first display unit is in the non-display state. In this way, an operation specified by the user may be performed with lower power consumption.

According to the embodiment, there is provided another electronic device as shown in FIGS. 7 to 9. The electronic device is a first electronic device including a first displaying unit 110 and a first control key unit 120, where the first display unit 110 has a display state and a non-display state; the first control key unit 120 includes at least one control key module 121 for receiving a user input.

A region corresponding to the control key module 121 of the first control key unit 120 is a first preset region.

The control key unit 120 further includes a first display module 122 provided within the first preset region.

The first display module 122 is configured to display first information generated by a first type of trigger event in the case that the first display unit is in the non-display state.

A display area corresponding to the first display module 122 is smaller than a display area corresponding to the first display unit.

The control key module 121 is configured to control, in response to the user input and based on the first information, the first electronic device to execute a first operation associated with the first information.

For example, when a short message sent from a second electronic device is received by the first electronic device, the name of the sender of the short message is displayed by the first display module. When detecting a user input, such as a press, a slide or a touch, the control key module controls the first electronic device to display the short message by using the first display module or using the second display module as the second embodiment.

In other technology, a function of a control key is predetermined. For example, the RETURN key is configured to only control the first electronic device to perform the RETURN operation. However, in the third embodiment, the first control key unit controls the first electronic device to perform the first operation based on the displayed first information, whether a user input is received by the control key module and a parameter corresponding to the user input. In this way, the control key module may control the electronic device more flexibly and in a larger extent.

In practice, in the case that the first display unit is in the display state, the control key module of the first control key unit is configured to perform a predetermined operation as a regular control key; and in the case that the first display unit is in the non-display state, the control key module of the first control key unit is configured to control the electronic device to perform the first operation based on the first information and the user input. The first operation may be, for example, a display control or a switching control of the second display module.

According to the embodiment, there is provided an electronic device as shown in FIGS. 7 to 9. The electronic device is a first electronic device including a first displaying unit 110 and a first control key unit 120, where the first display unit 110 has a display state and a non-display state; the first control key unit 120 includes at least one control key module 121 for receiving a user input.

A region corresponding to the control key module 121 of the first control key unit 120 is a first preset region.

The control key unit 120 further includes a first display module 122 provided within the first preset region.

The first display module 122 is configured to display first information generated by a first type of trigger event in the case that the first display unit is in the non-display state.

A display area corresponding to the first display module 122 is smaller than a display area corresponding to the first display unit.

The first control key unit further includes an authentication module.

The authentication module is configured to extract a first characteristic of a user to obtain third information for authentication.

Specifically, the authentication unit may be configured to detect a fingerprint characteristic, an iris characteristic, or the like. The first characteristic is preferably a biologic characteristic of the user. The detected first characteristic is transformed into first information that can be processed by the first electronic device for an authentication. The authentication may be performed by a processor in the first electronic device. The processor may be a component of the first control key unit or a component of another functional unit of the first electronic device.

The authentication module may be a detecting component having a function of image collection such as a camera, or a sensing component such as a touch panel.

By providing the detecting unit in the embodiment, the third information may be collected to perform an authentication. Thus, the security performance of the first electronic device is enhanced.

Specifically, when a user B sends a message A to the first electronic device using the second electronic device, the first display module displays a name of the user B. At this point, if a user input is received by the control key unit, the authentication module obtains the first information by extracting the first characteristic of a user to determine whether the user is valid. If the user is valid, the content of the message A is displayed based on the user input and the first information.

In practice, the detecting module may be integrated with the display module and have the same technical effect. For example, a capacitive touch-control panel may be adopted. Different users have different forces, touched areas and touched shapes when pressing the control key module. In order to simplify the input operation, the first characteristic may be detected when the user input is detected. In this way, not only the operation security and information security of the first electronic device is guaranteed, but also the user operation is more convenient.

In practice, the authentication module may be provided within the region corresponding to the control key module, or a region around the control key module. For example, the authentication module may be a pinhole camera provided around the control key module to detect the first characteristic, which may be fingerprint information.

According to the embodiment, there is provided an electronic device as shown in FIGS. 7 to 9. The electronic device is a first electronic device including a first displaying unit 110 and a first control key unit 120, where the first display unit 110 has a display state and a non-display state; the first control key unit 120 includes at least one control key module 121 for receiving a user input.

A region corresponding to the control key module 121 of the first control key unit 120 is a first preset region.

The control key unit 120 further includes a first display module 122 provided within the first preset region.

The first display module 122 is configured to display first information generated by a first type of trigger event in the case that the first display unit is in the non-display state.

A display area corresponding to the first display module 122 is smaller than a display area corresponding to the first display unit.

When a user input is detected, a height difference between a plane of the first preset region of the first control key unit and a second plane on which the first display unit lies, varies.

The plane on which the first preset region lies is referred to as a first plane, and the plane on which the display region of the first display unit lies is referred to as the second plane. The first plane and the second plane are located on the same surface of the first electronic device. When the user input is received by the control key module, the height difference between the first plane and the second plane is referred to as a first height difference. When the user input is not received by the control key module, the height difference between the first plane and the second plane is referred to as a second height difference.

When the user input is received by the control key module, the first plane is not lower than the second plane, i.e., the first height difference is smaller than the second height difference. When the user input is not received by the control key module, the first plane is higher than the second plane, i.e., the first height difference is greater than the second height difference.

In achieving the variance of the height difference between the first plane and the second plane when the user input is received by the control key module, the display screen of the first display unit, which is integrated with the control key module, may be provided as a flexible display screen. Alternatively, the control key module may be provided with an elastic structure, which may deform in the direction of the force applied by the user input when the pressure of the user input is detected to be greater than a threshold.

In the embodiment, the deformation of the control key module is provided to improve the user experience.

According to the embodiment, there is provided another display method, applicable to a first electronic device as shown in FIGS. 7 to 9 including a first displaying unit 110 and a first control key unit 120, where the first display unit 110 has a display state and a non-display state; the first control key unit 120 includes at least one control key module for receiving a user input; a region corresponding to the control key module of the first control key unit 120 is a first preset region; and the control key 110 unit further includes a first display module provided within the first preset region.

Figure 12:
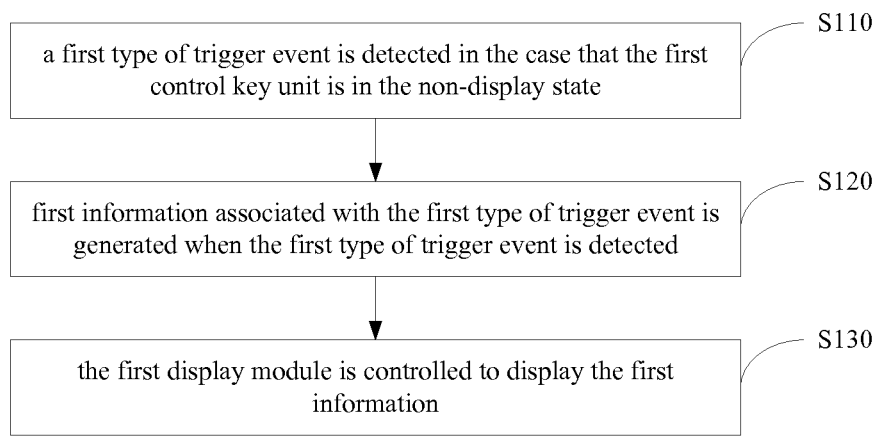
FIG. 12 is flow chart of another display method according to an embodiment of the present disclosure.

Referring to FIG. 12, the method includes steps S110 to S130.

In step S110, a first type of trigger event is detected in the case that the first control key unit is in the non-display state.

In step S120, first information associated with the first type of trigger event is generated when the first type of trigger event is detected.

In step S130, the first display module is controlled to display the first information.

The first display unit cannot display information in the non-display state. However, some information to be displayed may be triggered by a message sent from a second electronic device to the first electronic device or by some embedded instructions. For example, when it is an alarming time set in a mobile phone, the mobile phone vibrates and rings, and meanwhile the first display unit displays an icon of a clock application and corresponding time information. With the method according to the embodiment, the first information may be displayed by the first display module having a smaller area and lower power consumption. For example, information about the current time is displayed by the first display module when the electronic device vibrates and rings.

Apparently, with the method according to this embodiment, the power consumption may be reduced. For details of the first type of trigger event and structure of the first electronic device, reference may be made to the sixth embodiment, which will not be repeated herein.

According to the embodiment, there is provided another display method, applicable to a first electronic device as shown in FIGS. 7 to 9 including a first displaying unit 110 and a first control key unit 120, where the first display unit 110 has a display state and a non-display state; the first control key unit 120 includes at least one control key module for receiving a user input; a region corresponding to the control key module of the first control key unit 120 is a first preset region; and the control key 110 unit further includes a first display module provided within the first preset region.

Referring to FIG. 12, the method includes steps S110 to S130.

In step S110, a first type of trigger event is detected in the case that the first control key unit is in the non-display state.

In step S120, first information associated with the first type of trigger event is generated when the first type of trigger event is detected.

In step S130, the first display module is controlled to display the first information.

A region corresponding to the first control key unit includes the first preset region and a second preset region.

The control key unit further includes a second display module provided within the second preset region;

The sum of the display area corresponding to the first display module and a display area corresponding to the second display module is smaller than the display area corresponding to the first display unit.

Figure 13:
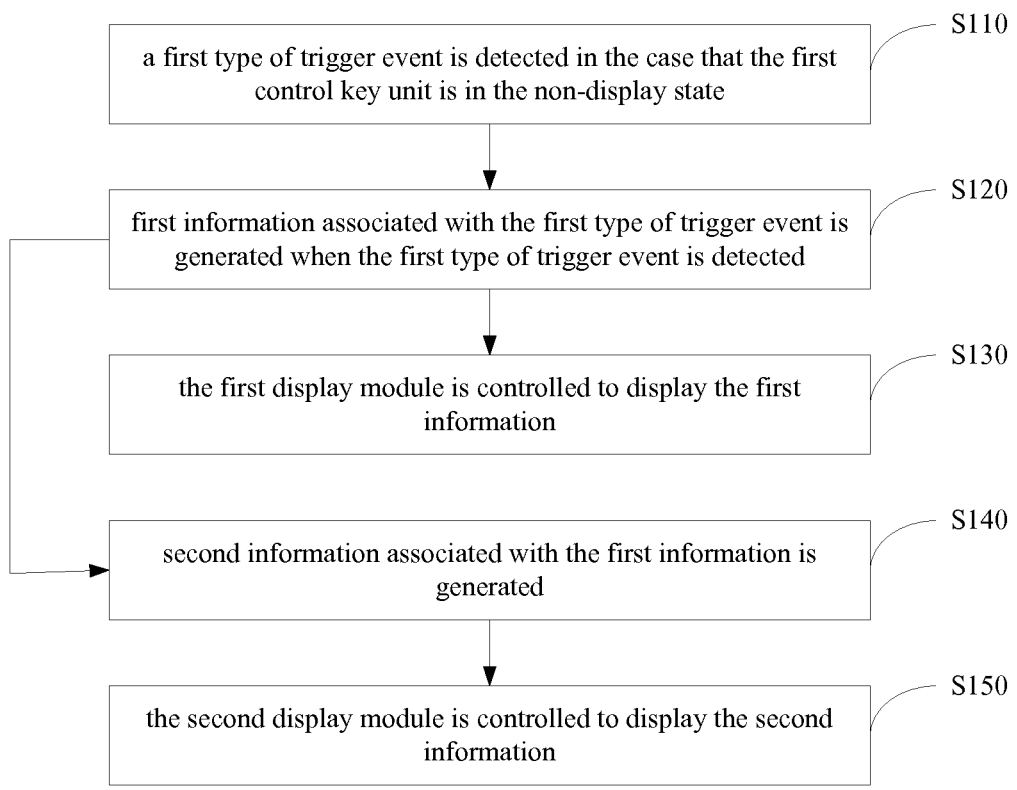
FIG. 13 is a flow chart of another display method according to an embodiment of the present disclosure.

Referring to FIG. 13, the method further includes steps S140 to S150.

In step S140, second information associated with the first information is generated.

In step S150, the second display module is controlled to display the second information.

In this embodiment, the first control key unit further includes the second display module, which may be configured to display the second information associated with the first information. For example, the second information is the content of a Wechat message sent from a second electronic device to the first electronic device, and the first information is identification information, such as a Wechat account used by the second electronic device that sends the Wechat message.

Apparently, by this method, information to be known by the user may be displayed while the first display unit is in the non-display state. Thus, not only the power consumption of the first electronic device is reduced, but also the user experience is improved.

According to the embodiment, there is provided another display method, applicable to a first electronic device as shown in FIGS. 7 to 9 including a first displaying unit 110 and a first control key unit 120, where the first display unit 110 has a display state and a non-display state; the first control key unit 120 includes at least one control key module for receiving a user input; a region corresponding to the control key module of the first control key unit 120 is a first preset region; and the control key 110 unit further includes a first display module provided within the first preset region.

Referring to FIG. 12, the method includes steps S110 to S130.

In step S110, a first type of trigger event is detected in the case that the first control key unit is in the non-display state.

In step S120, first information associated with the first type of trigger event is generated when the first type of trigger event is detected.

In step S130, the first display module is controlled to display the first information.

The method further includes:
receiving a user input via the control key module; and
executing a first operation associated with the first information in response to the user input.

The first operation includes switching on/off the second display module, switching on/off the first display unit, controlling the second display module to display the second information, or the like.

In other technology, a separately provided control key module can only execute a preset operation. In this embodiment, the operation executed by the first electronic device is associated with the first information displayed by the control key unit, enhancing the flexibility of the control of the first electronic device via the first control key unit.

According to the embodiment, there is provided another display method, applicable to a first electronic device as shown in FIGS. 7 to 9 including a first displaying unit 110 and a first control key unit 120, where the first display unit 110 has a display state and a non-display state; the first control key unit 120 includes at least one control key module for receiving a user input; a region corresponding to the control key module of the first control key unit 120 is a first preset region; and the control key 110 unit further includes a first display module provided within the first preset region.

Referring to FIG. 12, the method includes steps S110 to S130.

In step S110, a first type of trigger event is detected in the case that the first control key unit is in the non-display state.

In step S120, first information associated with the first type of trigger event is generated when the first type of trigger event is detected.

In step S130, the first display module is controlled to display the first information.

The first control key unit further includes a detecting module.

The method further includes the following steps:
detecting, by the detecting module, a first characteristic and obtaining third information based on the first characteristic;
performing an authentication based on the third information to obtain an authentication result; and
controlling the first electronic device to execute a first operation associated with the first information based on the authentication result.

In this embodiment, the first control key module further includes the detecting module, which may be configured to detect the first characteristic for performing the authentication, in order to avoid an invalid operation performed by an invalid user. For example, the first characteristic may be a biology characteristic of the user, such as a finger print, a voice print, or an iris characteristic. Alternatively, the first characteristic may be a secret key set by the user, such as a sliding track and/or direction on the first control key unit.

According to the embodiment, there is provided another display method, applicable to a first electronic device as shown in FIGS. 6 to 8 including a first displaying unit 110 and a first control key unit 120, where the first display unit 110 has a display state and a non-display state; the first control key unit 120 includes at least one control key module for receiving a user input; a region corresponding to the control key module of the first control key unit 120 is a first preset region; and the control key 110 unit further includes a first display module provided within the first preset region.

Referring to FIG. 12, the method includes steps S110 to S130.

In step S110, a first type of trigger event is detected in the case that the first control key unit is in the non-display state.

In step S120, first information associated with the first type of trigger event is generated when the first type of trigger event is detected.

In step S130, the first display module is controlled to display the first information.

The method further includes the following steps:

detecting, by a detecting module, a first characteristic to obtain third information when the control key module receives the user input.

Those skilled in the art should clearly know that the dividing for each functional module above is only exemplary for convenience and conciseness. In practice, the above functions may be performed by different functional modules based on the requirement, i.e., the apparatus includes different functional modules to perform all or part of the functions described above.

In the embodiments provided by this disclosure, it should be understood that the disclosed device and the method can be implemented in other ways. For example, the device embodiments described above is only illustrative, for example, the division of the units is simply a division in the logical function, and there may be other division ways in practical implementation, for example a plurality of units or components can be combined or integrated into another system, or several features can be ignored, without being performed. In addition, the coupling or direct coupling or communication connection between one another shown or discussed may be done via some interfaces, and indirect coupling or communication connection between devices or units may be performed in an electrical form, a mechanical form, or other forms.

The unit that is illustrated as a separate part may be or not be physically separated, and the component shown as a unit may be or not be a physical unit, that is, it may be located in one place or may be distributed to a plurality of network units. Part or all of the units may be selected according to actual needs to implement the object of the scheme of the embodiments.

In addition, the functional units in the embodiments of the disclosure may be integrated into one processing unit, or each unit can exit separately, or two or more units may be integrated into one unit. The integrated units described above may be implemented in a form of hardware, or may be implemented in a form of software functional unit.

If the integrated unit is implemented in the form of software functional unit and is sold or used as a separate product, it can be stored in a computer readable storage medium. Based on such understanding, the technical scheme of the disclosure essentially or its part that provides contribution to the existing technology or all or part of the technical scheme may be expressed in the form of a software product. The computer software product is stored in one storage medium, and includes several instructions which enable a computer (which may be a personal computer, a server, or a network device, etc.) device to execute all or part of steps of the method of each embodiment of the disclosure. The storage medium described above includes: a USB disk, a mobile hard disk, a Read-Only Memory (ROM), a Random Access Memory (RAM), a magnetic disc or a compact disc and all kinds of mediums which can store program codes, and etc.

The above embodiments are only used to introduce the technical solutions of the disclosure in detail. The illustration to the embodiments above is only to help to understand the method of the disclosure and the key idea thereof, and should not be understood as limiting to the disclosure. Changes or substitutions which may be easily conceived by those skilled in the art within the technical scope disclosed by the disclosure, fall within the scope of protection of the disclosure.

Apparently, those skilled in the art can make various types of changes and variations to the disclosure without departing from the spirit and scope of the disclosure. In this way, if the changes and variations to the disclosure fall within the scope of the claims of the disclosure and the equivalent technologies thereof, the disclosure is intended to include these changes and variations.

The invention claimed is:

1. An electronic device, comprising:
    a housing;
    a first body including a first touch display unit that is arranged on a first surface of the first body, wherein:
        the first touch display unit has a display state and a non-display state, and
        in a case that the first touch display unit is in the display state, the first touch display unit displays a first touch display content corresponding to an application running in a foreground in the electronic device; and
    a second body located in an end of the housing, wherein:
        the second body comprises a rotary shaft and a second touch display unit,
        the second touch display unit is configured to cover the rotary shaft and operable to rotate along with a rotation of the rotary shaft,
        in a case that the first touch display unit is in the non-display state, the second touch display unit is configured to display a first information generated by a first type of trigger event,
        in a case that the first touch display unit is in the display state:
            the electronic device has a first working mode and a second working mode,
            the electronic device is configured to switch between the first working mode and the second working mode based on a first angle between the electronic device and a horizontal plane,
            in a case that the first angle is within a first preset range, (i) the electronic device is set to the first working mode, and (ii) the second touch display unit is configured to: (a) display contents corresponding to at least one application running in a background in the electronic device by dragging, via a touch operation, an icon corresponding to the at least one application from the first touch display unit in a direction of the second touch display unit, and (b) cancel displaying contents of the second touch display unit corresponding to the at least one application by dragging, via the touch operation, the icon from the second touch display unit in a direction of the first touch display unit, and in a case that the first angle is within a second preset range that does not overlap the first preset range, (i) the electronic device is set to the second working mode and (ii) the second touch display unit is configured to display a second touch display content corresponding to and different from the first touch display content.

2. The electronic device according to claim 1, wherein a display area of the second touch display unit is smaller than a display area of the first touch display unit.

3. The electronic device according to claim 1, wherein:
a region corresponding to the second touch display unit comprises a first preset region and a second preset region;
a first display module is provided within the first preset region;
a second display module is provided within the second preset region; and
the second display module is configured to display second information associated with the first information in the case that the first display module displays the first information.

4. The electronic device according to claim 1, further comprising a control module configured to control the electronic device to execute a first operation associated with the first information in response to a user input.

5. The electronic device according to claim 1, further comprising an authentication module configured to extract a first characteristic of a user to obtain third information for authentication.

6. The electronic device according to claim 1, wherein:
the second body comprises a detecting unit configured to detect a portion of the second touch display unit that is not covered by the housing; and
the portion is operable to display a notifying message corresponding to at least one application of the electronic device.

7. The electronic device according to claim 6, wherein:
the second touch display unit covers a surface of a first portion of the rotary shaft; and
the surface of the first portion is exposed from the housing during rotation of the rotary shaft.

8. The electronic device according to claim 7, wherein:
the second body further comprises a supporting portion that is operable to rotate within a preset range of angle along with the rotation of the rotary shaft; and
the supporting portion is configured to support the electronic device in response to the supporting portion rotating to a preset position.

9. The electronic device according to claim 8, wherein:
the supporting portion comprises a first end connected with the rotary shaft and a second end provided with a through hole; and
the through hole is operable to snap a clip arranged on the housing to fix the supporting portion to the housing.

10. A display method of an electronic device, wherein:
the electronic device comprises a first body, a second body, a housing, a first touch display unit being arranged on the first body and a second touch display unit being arranged on the second body;
the first touch display unit has a display state and a non-display state; and in a case that the first touch display unit is in the display state, the electronic device has a first working mode and a second working mode, the display method comprising:

in a case that the first touch display unit is in the non-display state:
detecting a first type of trigger event;
generating a first information associated with the first type of trigger event in the case that the first type of trigger event is detected; and
controlling the second touch display unit to display the first information; and in a case that the first touch display unit is in the display state:
detecting a working mode of the electronic device based on a first angle between the electronic device and a horizontal plane, wherein:
in a case that the first angle is within a first preset range, the electronic device is in the first working mode, and
in a case that the first angle is within a second preset range that does not overlap the first preset range, the electronic device is in the second working mode;
in response to determining the electronic device is in the first working mode, (i) displaying a first display content on the first touch display unit of the first body, (ii) displaying a second display content corresponding to at least one application running in a background in the electronic device on the second touch display unit of the second body dragging, via a touch operation, an icon corresponding to the at least one application from the first touch display unit in a direction of the second touch display unit, and (iii) cancelling display contents of the second touch display unit corresponding to the at least one application by dragging, via the touch operation, the icon from the second touch display unit in a direction of the first touch display unit, wherein
the first display content corresponds to an application running in a foreground in the electronic device, and
the second display content comprises a message corresponding to at least one application running in the background in the electronic device; and
controlling the second touch display unit to display a third display content in response to determining that the working mode of the electronic device is switched from the first working mode to the second working mode,
wherein the third display content corresponds to the first display content and is different from the first display content.

11. The display method according to claim 10, wherein the electronic device is:
in the first working mode in response to determining that the first angle is not greater than the first preset range, and
in the second working mode in response to determining that the first angle is not greater than the second preset range, wherein a minimum value of the second preset range is not less than a maximum value of the first preset range.

12. The display method according to claim 10, wherein:
the second touch display unit comprises a first region and a second region;
a first display module is provided within the first region;

a second display module is provided within the second region; and the display method comprises:

generating second information associated with the first information; and controlling the second display module to display the second information.

13. The display method according to claim 10, further comprising:

receiving a user input; and executing a first operation associated with the first information in response to the user input.

14. The display method according to claim 13, further comprising extracting a first characteristic of user to obtain third information for authentication.

15. The method according to claim 10, further comprising, in the case that the electronic device is in the first working mode:

detecting a first operation in relation to the second display content on the second touch display unit; and controlling, in response to the first operation, the first touch display unit to replace the first display content by a content corresponding to the second display content.

16. The method according to claim 10, further comprising, after controlling the second touch display unit to display the third display content in the case that the working mode of the electronic device is switched from the first working mode to the second working mode:

detecting a second operation in relation to the third display content; and controlling, according to the second operation, the second touch display unit to switch display contents from the third display content to a display content corresponding to the second operation.

* * * * *